United States Patent
El Halawani et al.

(10) Patent No.: US 7,131,397 B2
(45) Date of Patent: *Nov. 7, 2006

(54) METHOD TO ENHANCE REPRODUCTIVE PERFORMANCE IN POULTRY

(75) Inventors: Mohamed E. El Halawani, St. Paul, MN (US); Israel Rozenboim, Mazkeret Batya (IL)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/900,024

(22) Filed: Jul. 27, 2004

(65) Prior Publication Data

US 2005/0072367 A1    Apr. 7, 2005

Related U.S. Application Data

(63) Continuation of application No. 10/321,787, filed on Dec. 17, 2002, now Pat. No. 6,766,767.

(60) Provisional application No. 60/343,426, filed on Dec. 21, 2001.

(51) Int. Cl.
    *A01K 29/00* (2006.01)

(52) U.S. Cl. ..................................... 119/174

(58) Field of Classification Search ................ 119/174, 119/518, 6.8
    See application file for complete search history.

(56) References Cited

U.S. PATENT DOCUMENTS

| | | |
|---|---|---|
| 4,625,728 A | 12/1986 | Schonberg |
| 4,765,337 A | 8/1988 | Schonberg |
| 4,872,421 A | 10/1989 | Laurent et al. |
| 6,410,602 B1 | 6/2002 | Lignell et al. |
| 6,573,254 B1 | 6/2003 | Kuenzel et al. |
| 6,766,767 B1 * | 7/2004 | El Halawani et al. ...... 119/174 |

OTHER PUBLICATIONS

Benoit, J., "The role of the eye and the hypothalamus in the photostimulation of gonads in the duck.", *Ann. New York Acad. Sci.* 117.(1964),204-216.

Felts, J V., et al., "Influence of light sources on the growth and reproduction of large white turkeys", *Poultry Science.* 69(4), (1990),576-583.

Gill, D J., et al., "Effects of light environment and population density on growth performance of male turkeys", *Poultry Science.* 63(7), (1984),1314-1321.

Harrison, P C., et al., "Influence of decreased length of different spectral photoperiods on testis development of domestic fowl", *J. Reprod. Fertil.*, 22, (1970),269?275.

Hulet, R M., et al., "The effect of light source and intensity on turkey egg production", *Poultry Science.* 71(8)., (1992),1277-1282.

Jones, J E., et al., "The effects of red and white light during the pre breeder and breeder periods on egg production and feed consumption in large-white turkeys", *Poultry Science.* 61(9), (1982),1930-1932.

Levenick, C K., et al., "Effects of photoperiod and filtered light on growth reproduction and mating behavior of turkeys 1. Growth performance of two lines of males and females", *Poultry Science.* 67(11), (1988),1505-1513.

(Continued)

*Primary Examiner*—Teri Pham Luu
*Assistant Examiner*—Elizabeth Shaw
(74) *Attorney, Agent, or Firm*—Schwegman, Lundberg, Woessner & Kluth, P.A.

(57) ABSTRACT

A method for enhancing the reproductive performance of poultry is provided.

30 Claims, 3 Drawing Sheets

EFFECT OF LIGHT SPECTRUM ON EGG PRODUCTION
AVG. EGGS/HEN/WK

| WEEK | WHITE | | GREEN | | RED | |
|---|---|---|---|---|---|---|
| | KLH | VIP | KLH | VIP | KLH | VIP |
| 1 | 0.00 | 0.00 | 0.00 | 0.00 | 0.00 | 0.00 |
| 2 | 0.00 | 0.00 | 0.00 | 0.00 | 0.00 | 0.00 |
| 3 | 0.91 | 0.31 | 0.00 | 0.03 | 0.35 | 0.38 |
| 4 | 4.82 | 3.11 | 0.00 | 0.10 | 3.97 | 3.35 |
| 5 | 5.29 | 5.04 | 0.38 | 0.19 | 5.69 | 4.97 |
| 6 | 5.19 | 5.03 | 0.88 | 0.50 | 5.79 | 4.85 |
| 7 | 5.00 | 5.05 | 0.85 | 0.88 | 5.32 | 5.29 |
| 8 | 3.91 | 4.53 | 1.23 | 0.82 | 4.53 | 4.75 |
| 9 | 3.19 | 4.40 | 1.38 | 0.91 | 4.63 | 4.63 |
| 10 | 3.38 | 3.89 | 1.44 | 0.97 | 4.22 | 4.16 |
| 11 | 3.63 | 4.03 | 1.84 | 1.06 | 4.28 | 4.44 |
| 12 | 3.22 | 3.93 | 1.55 | 1.07 | 3.94 | 4.32 |
| 13 | 3.03 | 3.87 | 1.76 | 1.09 | 4.19 | 4.54 |
| 14 | 2.94 | 3.78 | 1.75 | 1.09 | 4.19 | 4.19 |
| 15 | 3.13 | 4.10 | 1.68 | 1.35 | 3.91 | 4.63 |
| TOTAL EGG/WK | | | | | | |
| AVG. | 3.66 | 3.93 | 1.34 | 0.77 | 4.23 | 4.19 |

OTHER PUBLICATIONS

North, M O., et al., "Lighting management", *Chicken Production Manual*,Chapman and Hall, N.Y,(1990),407-431.

Phogat, S B., et al., "Effect of red and green lights on growth of quail", *Indian J. Poult. Sci.*, 20, (1985),126?128.

Proudfoot, F G., et al., "Response of turkey broilers to different stocking densities lighting treatments toe clipping and intermingling the sexes", *Poultry Science*, 58(1), (1987),28-36.

Pryzak, R., et al., "Effect of light quality on egg production of caged turkey hens", *Poultry Science*. 65(1), (1986),199-200.

Pryzak, R, et al., "Effect of light quality on erratic egg laying of caged turkey hens", *Poultry Science*. 65(4), (1986),795-800.

Pryzak, R, et al., "The effect of light color on egg quality of turkey hens in cages", *Poultry Science*. 65(7), (1986),1262-1267.

Pryzak, R., et al., "The effect of light wavelength on the production and quality of eggs of the domestic hen", *Theriogenology*, 28, (1987),947-960.

Ringoen, A R., ". Effect of continuous green and red light illumination on gonadal response in English sparrow (Passar domesticus linnaeus)", *Am. J. Anat.* 71, (1942),99?112.

Rozenboim, I., et al., "New Monochromatic Light Source for Laying Hens", *Poultry Science*, 77, (1998),1695-1698.

Scott, H. M., et al., "Light in relation to the experimental modification of the breeding season of turkeys", *Poultry Science*, 16, (1937),90-96.

Siopes, T. D., "Effect of high and low intensity cool white fluorescent lighting on the reproductive performance of turkey breeder hens", *Poultry Science*, 63(5), (1984),920-926.

Siopes, T D., "Light intensity effects on reproductive performance of turkey breeder hens", *Poultry Science*, 70(10), (1991),2049-2054.

Siopes, T D., "The effect of full spectrum fluorescent lighting on reproductive traits of caged turkey hens", *Poultry Science*, 63(6), (1984),1122-1128.

\* cited by examiner

EFFECT OF LIGHT SPECTRUM ON EGG PRODUCTION
AVG. EGGS/HEN/WK

| WEEK | WHITE | | GREEN | | RED | |
|---|---|---|---|---|---|---|
| | KLH | VIP | KLH | VIP | KLH | VIP |
| 1 | 0.00 | 0.00 | 0.00 | 0.00 | 0.00 | 0.00 |
| 2 | 0.00 | 0.00 | 0.00 | 0.00 | 0.00 | 0.00 |
| 3 | 0.91 | 0.31 | 0.00 | 0.03 | 0.35 | 0.38 |
| 4 | 4.82 | 3.11 | 0.00 | 0.10 | 3.97 | 3.35 |
| 5 | 5.29 | 5.04 | 0.38 | 0.19 | 5.69 | 4.97 |
| 6 | 5.19 | 5.03 | 0.88 | 0.50 | 5.79 | 4.85 |
| 7 | 5.00 | 5.05 | 0.85 | 0.88 | 5.32 | 5.29 |
| 8 | 3.91 | 4.53 | 1.23 | 0.82 | 4.53 | 4.75 |
| 9 | 3.19 | 4.40 | 1.38 | 0.91 | 4.63 | 4.63 |
| 10 | 3.38 | 3.89 | 1.44 | 0.97 | 4.22 | 4.16 |
| 11 | 3.63 | 4.03 | 1.84 | 1.06 | 4.28 | 4.44 |
| 12 | 3.22 | 3.93 | 1.55 | 1.07 | 3.94 | 4.32 |
| 13 | 3.03 | 3.87 | 1.76 | 1.09 | 4.19 | 4.54 |
| 14 | 2.94 | 3.78 | 1.75 | 1.09 | 4.19 | 4.19 |
| 15 | 3.13 | 4.10 | 1.68 | 1.35 | 3.91 | 4.63 |
| TOTAL EGG/WK | | | | | | |
| AVG. | 3.66 | 3.93 | 1.34 | 0.77 | 4.23 | 4.19 |

FIG. 1

METHOD TO ENHANCE REPRODUCTIVE PERFORMANCE IN POULTRY

CROSS-REFERENCE TO RELATED APPLICATIONS

This application is a continuation of U.S. patent application Ser. No. 10/321,787, filed Dec. 17, 2002, now U.S. Pat. No. 6,766,767, issued Jul. 27, 2004, which claims benefit under 35 U.S.C. 119(e) of U.S. Provisional Application Ser. No. 60/343,426 filed Dec. 21, 2001.

BACKGROUND OF THE INVENTION

The most abundant wavelengths found in sunlight and many artificial bright light sources are those in the green-yellow portion of the spectrum, i.e., 520 nm to 575 nm. In modern poultry houses, artificial illumination may be the only source of light provided to birds; thus, the duration, intensity, and quality of light become important environmental factors, as light influences both reproductive and productive systems in domestic fowl. Light quality can be defined by two criteria: 1) dose intensity, and 2) quality spectra (Andrews and Zimmerman, 1990). In birds from subtropical and temperate latitudes, photostimulation increases egg production, whereas a reduction in photoperiod delays or decreases production. In addition, light intensity plays an important role in rearing birds, mainly because birds need a certain light intensity to be photostimulated (North and Bell, 1990).

The avian eye, similarly to the human eye, is capable of seeing in a narrow part of the light spectrum (up to 760 nm). Apart from the eyes, birds are equipped with active extra-retinal photoreceptors, located in several parts of the brain, which are involved in transduction of photostimulation. As photostimulation of birds is an integral component of sexual maturation and reproductive performance, there have been numerous reports on the effect of different sources (wavelengths) of light on sexual maturation and reproductive performance in birds (see, for instance, Harrison et al., 1970; Scott and Payne, 1937; Ringoen, 1942; Benoit, 1964; and Phogat et al., 1985). For example, in studies using filtered light, increased growth of turkeys was observed when turkeys were exposed to shorter wavelengths (Proudfoot et al., 1979; Gill and Leighton, 1984; Levenick and Leighton, 1988), whereas sexual maturity was stimulated with white or red, but not blue, light (Scott and Payne, 1937). Schonberg (U.S. Pat. No. 4,625,728) discloses that green light (400 to 600 nm) increases the growth rate of very young chickens, including embryos, while near red light (600 to 670 nm) induces maximal sexual development and may improve egg production. However, Jones et al. (1982) found that red light during the prebreeder or breeder periods was not beneficial for egg production.

Siopes (1984a) found no differences in egg production, fertility, or poult weight when hens were exposed to incandescent (IN) or full-spectrum fluorescent (FL) light treatments or when exposed to cool-white or full-spectrum FL light treatments, respectively (Siopes, 1984b). Felts et al. (1990) reported significantly higher hen-day egg production only during the first 10 weeks of the production period for females exposed to sodium vapor (SV) or daylight FL (DF) lights than for those under IN lights. On the other hand, Hulet et al. (1992) found no significant differences in egg production when hens were exposed to SV, DF, or IN lights.

Light intensity is also considered an important characteristic that relates to egg production. In a study comparing filtered-red light with white light at 85 and 160 1x, Jones et al. (1982) found that at 85 1x, egg production was equal between the two light sources. However, at 160 1x, hens exposed to white light had decreased egg production over those hens exposed to 84 1x. Pyrzak and Siopes (1986b; 1986c; 1989) examined the effects of equalized (photons/$cm^2$/second) blue, green, and red light on egg quality and oviposition behavior. The authors found no difference in oviposition rate or patterns, but found that red light caused hens to lay heavier eggs with great quantities of albumen per egg. Pyrzak et al. (1987) report that eggs laid under blue or green light were consistently larger then those laid under red light (Pyrzak et al., 1987).

Siopes (1991) reported that light intensity from IN light ranging from 54 to 324 1x had no significant effect on reproductive performance of caged turkey hens. Pyrzak and Siopes (1986a) relate that reproductive performance was not different among turkey hens exposed to either IN, blue, green, or red light when the intensity (photons/$cm^2$) remained constant. Felts et al. (1992) disclose that in the presence of a male, female breeder turkeys exposed to a fixed intensity with a DF light source (peak 495–590 nm, green to yellow) or to a SV light source (peak 580 nm, yellow) produced significantly more eggs than those under an IC light source (570 to 700 nm, yellow to red). Rozenboim et al. (1998) exposed prelaying pullets to one of three light treatments: 0.1 or 0.01 W/$m^2$ with LED lamps (560 nm, 660 nm or 880 nm) and 0.1 W/$m^2$ mini-fluorescent lamps. They report that a significant reduction in egg production was found in the 880 nm group and that no differences in egg production were found in other groups.

The reproductive efficiency of turkeys is generally low. Thus, turkeys are one example of poultry where the need to enhance reproductive performance is particularly high. One component of this low efficiency is the small amount of egg laying, which is related to a variable propensity toward cessation of egg laying and associated incubation behavior (broodiness). The term "broodiness" describes the behavior and physiological state associated with the maternal care of unhatched eggs. The expression of broody behavior by turkey hens is a costly problem to turkey breeders and producers of hatching eggs, resulting in a substantial loss of egg production.

Thus, what is needed is a method to enhance the reproductive performance of poultry, e.g., egg production in turkeys.

SUMMARY OF THE INVENTION

The present invention provides a method to enhance (increase) reproductive performance in poultry. The method comprises exposing one or more poultry during one or more photoperiods, e.g., a plurality of consecutive photoperiods, to one or more light sources so as to enhance the reproductive performance of the poultry. As described herein, retinal photoreceptors of poultry have their maximum sensitivity in the green-yellow part of the spectrum, and these photoreceptors have an inhibitory effect on the gonads. In contrast, the extra-retinal receptors of poultry are stimulated by the red portion of the spectrum (for instance, greater than 630 nm), while the green-yellow part of the spectrum has little or no stimulatory effect on these receptors. Reproductive efficiency in poultry is likely a function of the relative activation or stimulation of extra-retinal photoreceptors and retinal photoreceptors. Therefore, stimulation of the extraretinal photoreceptors and the lack of stimulation or inhibition of the retinal photoreceptors together contribute to reproductive performance.

Thus, the method of the invention comprises exposing one or more poultry to one or more light sources that emit radiation at one or a plurality of wavelengths (i.e., in a particular spectral region or "band" which does not represent the spectrum emitted by white light) which stimulates gonadal development, preferably by stimulating the extraretinal receptors, i.e., radiation from 600 nm to 900 nm (inclusive), and radiation at one or a plurality of wavelengths (a band which is not the spectrum emitted by white light) which is not stimulatory or may inhibit gonadal development, preferably by not stimulating or inhibiting the retinal receptors, i.e., from 300 nm to less than 600 nm, each for a period of time so as to result in enhanced reproductive performance in the poultry. Accordingly, the first wavelength of light or band of light is selected as one or a plurality of wavelengths which stimulate gonadal development of the poultry, whereas the second wavelength of light or band of light is selected as one or a plurality of wavelengths which does not stimulate, and may inhibit, gonadal development of the poultry, i.e., the first and second wavelengths or bands are different, e.g., do not overlap. In one embodiment, a single light source with one lamp is employed, e.g., two filters are used in conjunction with the single lamp to provide the two desired bands or wavelengths of light. In another embodiment, a single light source with at least two lamps is employed, wherein one lamp is employed to emit the first band or wavelength of light, and the other lamp is employed to emit the second band or wavelength of light. In yet another embodiment of the invention, at least two light sources are employed. In this embodiment, one light source emits the first band or wavelength of light and a second light source emits the second band or wavelength of light.

The length of the first and second periods of time may be the same or different. In one embodiment, the second period of time is shorter than the first period of time. However, in some circumstances, it may be desirable to expose poultry, i.e., toms, to a band or wavelength of light which is not stimulatory or may inhibit gonadal development for a period of time which is longer than the exposure to a band or wavelength of light which is stimulatory to gonadal development.

Poultry may be exposed to the different bands or wavelengths concurrently or sequentially, in any order. Thus, poultry, during a particular photoperiod, may be exposed to the first band or wavelength of light alone, then to both bands or wavelengths of light, then to the first band or wavelength alone. Alternatively, the poultry may be exposed to both bands or wavelengths of light simultaneously then to the first band or wavelength of light alone, or to the first band or wavelength of light then to both bands or wavelengths of light. In another embodiment, poultry, e.g., toms, may be exposed to the second band or wavelength of light alone, then to both bands or wavelengths of light, then to the second band or wavelength alone, or exposed to both bands or wavelengths of light simultaneously then to the second band or wavelength of light alone, or to the second band or wavelength of light then to both bands or wavelengths of light. However, any combination of selected bands or wavelengths, exposure periods and chronology of exposure of the two different wavelengths or bands, may be employed so long as reproductive performance is enhanced in treated poultry relative to untreated poultry. In one embodiment, photostimulation of poultry with radiation substantially in the red portion of the spectrum, preferably greater than about 630 nm, with limited radiation in the green-yellow portion of the spectrum (preferably 520 nm to 575 nm), results in enhanced reproductive efficiency.

In one preferred embodiment, one or more poultry are exposed during one or more photoperiods to at least two light sources. In any one photoperiod, poultry are exposed to the first light source which emits a first band or wavelength of light which is stimulatory for gonadal development. Then the poultry are simultaneously exposed to a second light source which emits a second band or wavelength of light that is not stimulatory for gonadal development and the first light source. Finally, the poultry are exposed to only the first light source.

The invention further provides a method to enhance reproductive performance in poultry, e.g., turkeys. The method comprises exposing one or more poultry during one or more photoperiods to a first light source which emits substantially red light for greater than 13 hours and to a second light source which emits substantially green-yellow light for less than 11 hours, wherein the poultry are concurrently exposed to red light when they are exposed to green-yellow light. Also provided is a method to enhance reproductive performance in poultry comprising exposing one or more poultry during one or more photoperiods to a light source which emits substantially red light for greater than 13 hours and emits substantially green-yellow light for less than 11 hours, wherein the poultry are concurrently exposed to red light when they are exposed to green-yellow light.

The invention further provides a method comprising exposing one or more poultry during one or more photoperiods to a first light source which emits substantially green-yellow light for greater than 13 hours and to a second light source which emits substantially red light for less than 11 hours, wherein the poultry are concurrently exposed to green-yellow light when they are exposed to red light. Also provided is a method to enhance reproductive performance in poultry, comprising exposing one or more poultry during one or more photoperiods to a light source which emits substantially red light for greater than 13 hours and emits substantially green-yellow light for less than 11 hours, wherein the poultry are concurrently exposed to red light when they are exposed to green-yellow light.

In one preferred embodiment, the use of the method of the invention results in egg production by hens that is enhanced by at least 5%, preferably at least 10%, and even more preferably by at least 15%, relative to hens not subjected to the method.

BRIEF DESCRIPTION OF THE DRAWINGS

FIG. 1 shows the effect of the exposure of a particular light spectrum on egg production in turkeys.

DETAILED DESCRIPTION OF THE INVENTION

Definitions

Figure 2:
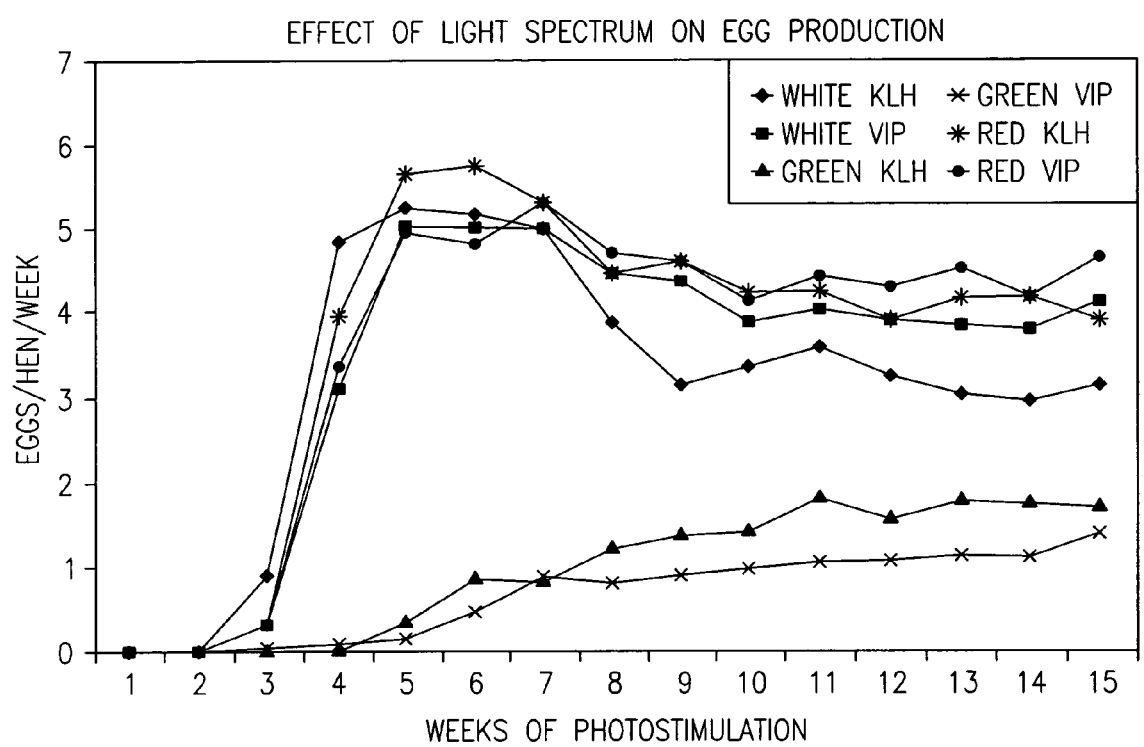
FIG. 2 shows the data in FIG. 1 in graph form.
Figure 3A:
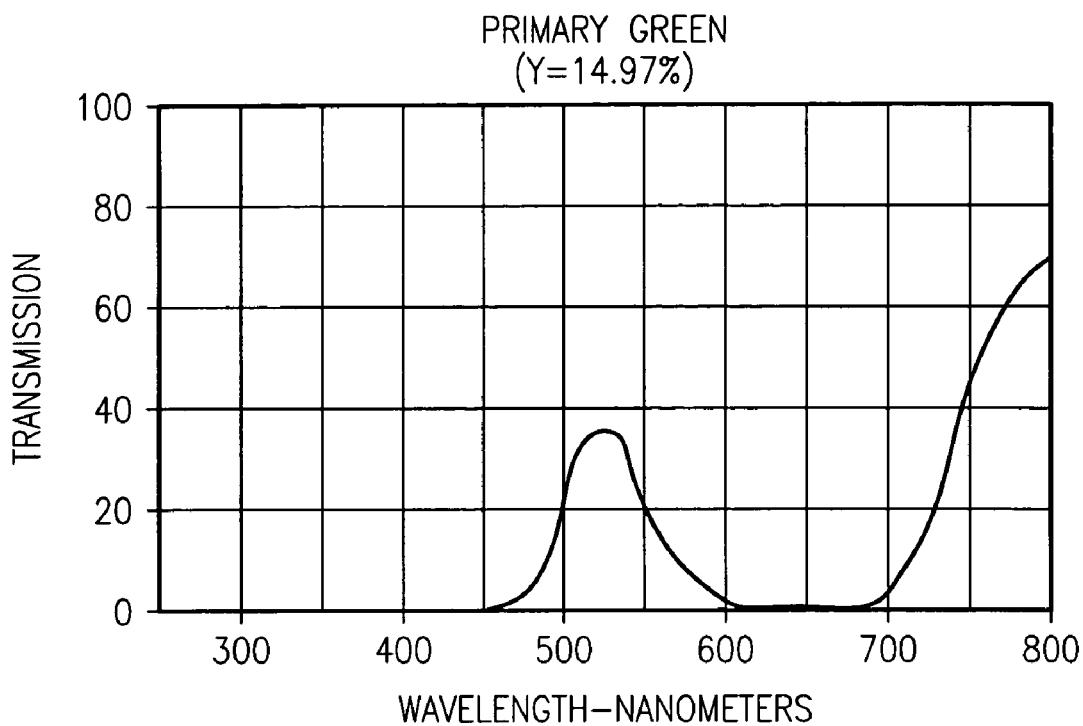
FIG. 3 show the spectrum transmitted using a primary green filter and a bright red filter (see Example).
Figure 3B:
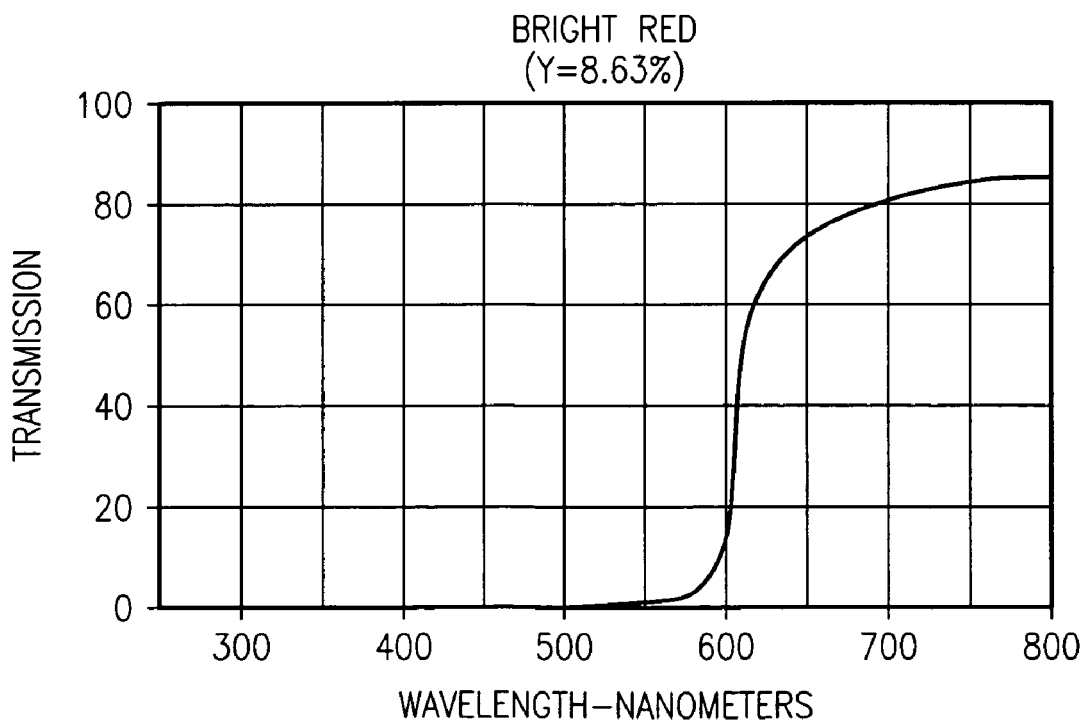

As used herein, "enhanced or increased reproductive performance" of poultry means that the method of the invention results in poultry having an increase, e.g., a statistically significant increase, in the number of follicles, an increase in the rate of egg production (for hens), an increase in ovulation (for hens), an increase in number of eggs laid (for hens), an increase in egg mass (for hens), a decrease in (reduced) broodiness (for hens), altered food intake, an increase in the onset of sexual maturation, a decrease in agitated behavior (calmer poultry), an increase in clutch size (for hens), a decrease in prolactin levels, an increase in lutinizing hormone (LH) levels, an increase in follicle stimulating hormone (FSH), delayed onset of photorefractoriness, an increase in sperm concentration (for toms), an increase in semen volume (for toms), an increase in sperm quality (e.g., higher sperm viability, higher sperm motility, an increased ratio of viable to non-viable sperm, fewer abnormal cells, or enhanced binding of viable sperm to the periviteline membrane), or any combination thereof, relative to control poultry. Enhanced reproductive performance can be measured by methods known to the art.

"Poultry" as used herein includes, but is not limited to, turkeys, chickens, ostrich, cockatiels, game birds and water fowl, for instance, pheasant, geese and ducks.

As used herein, a light source, e.g., a lamp, which "substantially" emits a particular band or wavelength(s) of light is a light source in which more than 50%, preferably more than 60%, and more preferably more than 80%, of the band or wavelength(s) that are emitted are of the specified band or wavelength(s). For instance, a light source which emits substantially red light emits more that 50%, preferably more than 60%, and more preferably more than 80%, of the total light in the red portion of the spectrum. The red portion of the spectrum is defined herein as wavelengths longer than about 610 nm, preferably longer than about 620 nm, and less than about 730 nm, e.g., wavelengths of 630 nm to 720 nm. A light that emits substantially green-yellow light is one in which more than 50%, preferably more than 60%, and more preferably more than 80%, of the total light in the green-yellow portion of the spectrum. The green-yellow portion of the spectrum is defined herein as light of wavelengths from about 490 nm to less than 600 nm, preferably from about 520 nm to about 575 nm.

I. General Methods of the Invention

The present invention provides a method to enhance the reproductive performance of poultry. The method comprises exposing poultry to selected bands or wavelengths of light for controlled periods of time so as to result in a desirable phenotype, e.g., enhanced reproductive performance.

A specific embodiment of the present invention includes exposing one or more poultry during one or more photoperiods to a first band or wavelength of light for a first period of time and to a second band or wavelength of light for a second period of time. The two bands or wavelengths are different. The first band or wavelength is stimulatory for gonadal development, and preferably stimulates extra-retinal photoreceptors. The first band or wavelength of light is from 600 nm to 900 nm (inclusive). In one embodiment, the first band or wavelength is from 620 nm to 730 nm, which includes a "near red" band width. This wavelength of light may also calm poultry, which can result in lower morbidity and mortality, thereby providing a great economic benefit in poultry management. Any light source which emits such a wavelength preferentially, i.e., at least 50% of the light emitted by the light source is a wavelength(s) that enhances gonadal development, can be employed in the methods of the invention.

The second band or wavelength of light does not stimulate, and may inhibit, gonadal development of the poultry, e.g., the second band or wavelength is not stimulatory for extra-retinal receptors but is recognized by retinal receptors. The second band or wavelength of light is from 300 nm to less than 600 nm. Any light source which emits such a band or wavelength, i.e., at least 50% of the light emitted by the light source is a wavelength that does not stimulate gonadal development. For instance, a light source having 50% of its emission at wavelengths from 490 nm to less than 600 nm is an exemplary light source for use in the methods of the invention.

Thus, the use of the combination of the two bands or wavelengths during prebreeder and/or breeder stages results in poultry with enhanced reproductive performance.

II. Preferred Cycles of Dark and Light and Ratios of the Two Wavelengths

Generally, prior to reaching a proper body weight for sexual maturation, poultry are exposed to periods of illumination each day that are shorter than normal ambient light periods. Once poultry reach a proper body weight for sexual maturation, the illumination period is drastically increased to periods that are longer than normal ambient light periods; this induces maximal sexual development.

In the methods of the invention, prior to reaching a proper body weight for sexual maturation, poultry may be exposed to any light source, e.g., to an incandescent lamp without a filter or to two incandescent lamps, one with a filter that yields light from 600 nm to 900 nm and the other with a filter that yields light from 300 nm to less than 600 nm. For example, when employing two incandescent lamps, one lamp has a red filter and the other with a green-yellow filter. Once poultry reach a proper body weight for sexual maturation, the illumination period is lengthened. In one embodiment of the invention, the poultry are exposed to the first band or wavelength of light for a majority of the extended illumination period. The poultry are also exposed to the second band or wavelength of light either before or after, or simultaneously with, the first band or wavelength of light. In one embodiment, the illumination period for the second wavelength of light is generally shorter than the period for the first wavelength, e.g., at ratios of 1:1.5, 1:2, 1:2.5 or 1:3. In another embodiment, the poultry, e.g., toms, are exposed to the second band or wavelength of light for a majority of the extended illumination period. The poultry are also exposed to the first band or wavelength of light either before or after, or simultaneously with, the second band or wavelength of light. In this embodiment, the illumination period for the first wavelength of light is shorter than the period for the second wavelength of light, e.g., at ratios of 1:1.5, 1:2, 1:2.5 or 1:3.

For breeders, preferred dark to light periods include from 4 to 14 hours preferably from 7 to 11 hours, and more preferably from 8 to 10 hours, of darkness, and from 10 to 20 hours, preferably from 13 to 17 hours, and more preferably 14 to 16 hours, of light. Dark to light periods for prebreeders include 15 to 21 hours, and preferably 17 to 19 hours, of darkness, and 2 to 10 hours, and preferably 4 to 8 hours of light.

III. Light Sources and Light Intensities

In the methods of the present invention, one or more light sources may be employed. Thus, one light source, for instance a light source with two lamps, may be used to emit both bands or wavelengths. The method of the present invention can alternatively employ two, or more than two, light sources, each having one or more lamps, to emit the different bands or wavelengths. The light source can comprise at least one incandescent lamp, a fluorescent lamp, a high sodium vapor lamp or a light emitting diode lamp, although the invention is not limited to those sources, as well as combinations of light sources, and, if necessary, a means to filter the spectrum of wavelengths which are emitted. In one specific embodiment of the invention, two light sources are employed, each of which comprises an incandescent lamp, one of which comprises a red filter and the other of which comprises a green-yellow filter.

The light intensities which may be employed in the methods of the invention include but are not limited to 0.001 $W/m^2$ to 100 $W/m^2$, preferably 0.01 $W/m^2$ to 50 $W/m^2$, or 0.05 $W/m^2$ to 5 $W/m^2$ or or 0.1 $W/m^2$ to 1 $W/m^2$.

The invention will be illustrated by the following non-limiting example.

EXAMPLE

Retinal photoreceptors of poultry have their maximum sensitivity in the green-yellow part of the spectrum. These photoreceptors have an inhibitory effect on the gonads. Removal of the eyes and the retinal photoreceptors eliminates this inhibition and prevents gonadal regression. The extra-retinal receptors of poultry are efficiently stimulated by the red portion of the spectrum (for instance, greater than 630 nm), while the green-yellow part of the spectrum has little or no stimulatory effect on these receptors. Thus, reproductive efficiency in poultry is likely a function of the relative stimulation of the extra-retinal photoreceptors and the retinal photoreceptors.

Materials and Methods

Turkeys were housed in rooms with 8'×8' pens. Large white female turkeys of the Nicholas strain were used. The hens were raised under incandescent lamps (60 W) with a lighting program of 14 hours of light daily up to 17 weeks of age. At that time, the birds were divided into two groups and subjected to 6 hours of light and 18 hours of darkness. One group was exposed to incandescent lamps (60 W, 0.1 $W/m^2$) for those 6 hours while the second group was exposed to incandescent lamps covered with red filters (red band, >630 nm, Lee filter #026 (HT), Gopher State Lighting, Mpls., Minn.), and incandescent lamps covered with green filters (green-yellow band, 520 nm to 575 nm, Lee filter #139 (HT), Gopher State Lighting, Mpls., Minn.).

At 29 weeks of age, the birds were divided into the following three treatment groups:

1) 15 hours of incandescent light (full spectrum), 9 hours of darkness;

2) 15 hours of green-yellow light, 6 hours of which included simultaneous exposure to red light (green-yellow: red=2.5:1), 9 hours of darkness; and 3) 15 hours of red light, 6 hours of which included simultaneous exposure to green-yellow light (green:red=1: 2.5), 9 hours of darkness.

Egg production as well as nesting activity was monitored and blood samples drawn for each group for a complete breeder season of 24 weeks or more. The levels of reproductive hormones, e.g., prolactin and leutinizing hormone, in the blood were measured. At the end of the season, birds are sacrificed and pituitary LHβ and FSHβ, and hypothalamic VIP, mRNA levels were determined.

Results

Birds that were photostimulated with a light spectrum dominant in red over green-yellow light (treatment 3) laid more eggs than hens exposed to a light spectrum dominant in green-yellow over red light (treatment 2), regardless of whether or not egg production was stimulated with VIP (FIGS. 1 and 2). The average number of eggs per hen per week for VIP immunized hens for the weeks during which the hens produced eggs was 4.23 eggs/hen/week for hens exposed to light with dominance in the red band, and 1.34 eggs/hen/week for hens exposed to light with dominance in the green-yellow band. Hens photostimulated with white light had intermediate egg production (3.66 eggs/hen/week). The intermediate level of egg production observed with incandescent light is likely the result of the full spectrum of light produced by incandescence lamps, which includes red and green-yellow light. It was also observed that birds photostimulated with a light spectrum dominant in red over green-yellow had decreased broody behavior.

Thus, the reproductive performance of both male and female birds can be enhanced by increasing the amount of light in the red band (>630 nm; 15 hours for turkeys) and limiting the amount of light in the green-yellow bands (520–575 nm; 6 hours for turkeys). However, male birds may show enhanced reproductive performance when the ratio of exposure of green-yellow to red light is >1.0, e.g., 1.25, 1.5, 2.0, 2.5, 2.75, 3.0 or greater. Any light (lamp) source may be employed in the methods of the invention, e.g., monochromatic light bulbs or LED lamps, or one which emits red or green-yellow light in addition to other wavelengths, e.g., incandescent, high sodium vapor or fluorescent lamps, when that light source is employed with a filter, e.g., a red or green-yellow filter.

REFERENCES

Andrews and Zimmerman, *Poultry Sci.*, 69: 1471 (1990).
Benoit, *Ann. New York Acad. Sci.*, 117:204 (1964).
Felts et al., *Poultry Sci.*, 69: 576 (1990).
Gill et al., *Poultry Sci.*, 63: 1314 (1984).
Harrison et al., *J. Reprod. Fertil.*, 22: 269 (1970).
Hulet et al., *Poultry Sci.*, 71: 1277 (1992).
Jones et al., *Poultry Sci.*, 61: 1930 (1982).
Levenick et al., *Poultry Sci.*, 67: 1505 (1988).
North and Bell, In: Chicken Production Manual, Chapman and Hall, N.Y., pg. 407 (1990).
Phogat, et al., *J. Poult. Sci.*, 20, 126 (1985).
Proudfoot et al., *Poultry Sci.*, 58, 28 (1987).
Pyrzak et al., *Poultry Sci.*, 65, 199 (1986a).
Pyrzak et al., *Poultry Sci.*, 65, 1262 (1986b).
Pyrzak et al., *Poultry Sci.*, 65, 795 (1986c).
Pyrzak et al, *Theriogenology*, 28, 947 (1987).
Ringoen, *Am. J. Anat.*, 71, 99 (1942).
Rozenboim et al., *Poultry Sci.*, 80, 1695 (1998).
Scott et al., *Poultry Sci.*, 16, 90 (1937).
Siopes, *Poultry Sci.*, 63, 1122 (1984a).
Siopes, *Poultry Sci.*, 63, 920 (1984b).
Siopes, *Poultry Sci.*, 70, 2049 (1991).

All publications, patents and patent applications are incorporated herein by reference. While in the foregoing specification this invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

The invention claimed is:

1. A method to enhance reproductive performance in turkeys, comprising:

exposing one or more turkeys during one or more photoperiods to one or more light sources so as to enhance the reproductive performance of the turkeys, wherein the one or more light sources emit a first wavelength of light for a first period of time, which first wavelength of light is stimulatory for gonadal development of the turkeys, and a second wavelength of light for a second period of time, which second wavelength of light is not stimulatory for gonadal development of the turkeys, wherein the first and the second wavelengths are different, wherein the second period of time is shorter than the first period of time, and wherein the turkeys are exposed to both wavelengths of light during the second period of time.

2. The method of claim 1 wherein the poultry are males.

3. The method of claim 2 wherein the males have enhanced semen volume or quality.

4. The method of claim 1 wherein the poultry are females.

5. The method of claim 4 wherein the females have enhanced egg production or enhanced egg mass.

6. The method of claim 5 wherein egg production is enhanced by at least 10%.

7. The method of claim 1 wherein the first wavelength is greater than 620 nm.

8. The method of claim 1 wherein the first wavelength is greater than 620 nm and less than 730 nm.

9. The method of claim 1 wherein the second wavelength is greater than 490 nm and less than 600 nm.

10. The method of claim 1 wherein one light source is employed to emit both wavelengths.

11. The method of claim 10 wherein the light source comprises at least one incandescent or fluorescent lamp with a filter.

12. The method of claim 10 wherein the light source comprises at least one high sodium vapor lamp with a filter.

13. The method of claim 10 wherein the light source comprises at least one light emitting diode lamp.

14. The method of claim 1 wherein two light sources are employed to emit the different wavelengths.

15. The method of claim 14 wherein at least one of the light sources comprises an incandescent or fluorescent lamp with a filter.

16. The method of claim 14 wherein at least one of the light sources comprises a high sodium vapor lamp with a filter.

17. The method of claim 14 wherein at least one of the light sources comprises a light emitting diode lamp.

18. The method of claim 14 wherein one of the light sources emits substantially red light.

19. The method of claim 14 wherein one of the light sources emits substantially green light.

20. The method of claim 1 wherein the first period of time is greater than 13 hours.

21. The method of claim 1 wherein the second period of time is less than 11 hours.

22. The method of claim 1 wherein the first period of time is 14 hours or more.

23. The method of claim 1 wherein the second period of time is 10 hours or less.

24. A method to enhance reproductive performance in poultry, comprising:
exposing one or more turkey during one or more photoperiods to at least two light sources so as to enhance the reproductive performance of the turkey,
wherein a first light source emits a first wavelength of light for a first period of time, which first wavelength of light is stimulatory for gonadal development of the turkeys, wherein a second light source emits a second wavelength of light for a second period of time, which second wavelength of light is not stimulatory for gonadal development of the turkey, wherein the first and the second wavelengths are different, wherein the second period of time is shorter than the first period of time, and wherein the turkeys are exposed to both wavelengths of light during the second period of time.

25. A method to enhance reproductive performance in turkeys, comprising:
exposing one or more turkeys during one or more photoperiods to a first light source which emits substantially red light for greater than 13 hours and to a second light source which emits substantially green-yellow light for less than 11 hours, wherein the turkeys are concurrently exposed to red light when they are exposed to green-yellow light.

26. A method to enhance reproductive performance in turkeys, comprising:
exposing one or more turkeys during one or more photoperiods to a light source which emits substantially red light for greater than 13 hours and emits substantially green-yellow light for less than 11 hours, wherein the turkeys are concurrently exposed to red light when they are exposed to green-yellow light.

27. A method to enhance reproductive performance in turkeys, comprising:
exposing one or more turkeys during one or more photoperiods to a first light source which emits substantially green-yellow light for greater than 13 hours and to a second light source which emits substantially red light for less than 11 hours, wherein the turkeys are concurrently exposed to green-yellow light when they are exposed to red light.

28. A method to enhance reproductive performance in turkeys, comprising:
exposing one or more turkeys during one or more photoperiods to a light source which emits substantially green-yellow light for greater than 13 hours and emits substantially red light for less than 11 hours, wherein the turkeys are concurrently exposed to green-yellow light when they are exposed to red light.

29. The method of claim 25 or 26 wherein the ratio of exposure of substantially red light to substantially green-yellow light is greater than 1.25:1.

30. The method of claim 27 or 28 wherein the ratio of exposure of substantially green-yellow light to substantially red light is greater than 1.25:1.

* * * * *

UNITED STATES PATENT AND TRADEMARK OFFICE
CERTIFICATE OF CORRECTION

PATENT NO. : 7,131,397 B2  Page 1 of 1
APPLICATION NO. : 10/900024
DATED : November 7, 2006
INVENTOR(S) : El Halawani et al.

It is certified that error appears in the above-identified patent and that said Letters Patent is hereby corrected as shown below:

In column 5, line 8, delete "lutinizing" and insert -- luteinizing --, therefor.

In column 5, line 15, delete "periviteline" and insert -- perivitelline --, therefor.

In column 7, line 11, after "or" delete "or". (Second Occurrence)

In column 7, line 56, delete "leutinizing" and insert -- luteinizing --, therefor.

In column 10, line 3, in Claim 24, delete "turkey" and insert -- turkeys --, therefor.

In column 10, line 5, in Claim 24, delete "turkey" and insert -- turkeys --, therefor.

In column 10, line 12, in Claim 24, delete "turkey" and insert -- turkeys --, therefor.

Signed and Sealed this

Twenty-seventh Day of February, 2007

JON W. DUDAS
*Director of the United States Patent and Trademark Office*